United States Patent [19]

Baule

[11] Patent Number: 5,214,614
[45] Date of Patent: May 25, 1993

[54] SEISMIC DIRECTIONAL SENSOR FOR SOLID-BORNE SOUND

[75] Inventor: Heinrich Baule, Bochum, Fed. Rep. of Germany

[73] Assignee: Wasagchemie Sythen Gesellschaft mit Beschrankter Haftung, Haltern-Sythen, Fed. Rep. of Germany

[21] Appl. No.: 690,904
[22] PCT Filed: Oct. 15, 1990
[86] PCT No.: PCT/DE90/00785
§ 371 Date: Jun. 14, 1991
§ 102(e) Date: Jun. 14, 1991

[30] Foreign Application Priority Data

Oct. 18, 1989 [DE] Fed. Rep. of Germany ....... 3934745

[51] Int. Cl.$^5$ .............................................. G01V 1/00
[52] U.S. Cl. ..................................... 367/58; 367/38; 367/59; 367/178; 181/104; 181/112
[58] Field of Search ..................... 367/58, 178, 38, 59, 367/61; 181/112, 104

[56] References Cited

U.S. PATENT DOCUMENTS

| 2,406,014 | 8/1946 | Harry | 177/352 |
| 3,573,723 | 4/1971 | Michon | 340/15.5 |
| 3,803,543 | 4/1974 | Cioccio | 367/155 |
| 4,300,220 | 11/1981 | Goff et al. | 367/188 |
| 4,800,981 | 1/1989 | Uttecht et al. | 181/104 |

FOREIGN PATENT DOCUMENTS

3519531A1 5/1985 Fed. Rep. of Germany.
3531230C2 4/1989 Fed. Rep. of Germany.

OTHER PUBLICATIONS

Aufsatz "Peilung von Bodenerschütterungen für technische Anwendungen" Von Horst Köhler, Jena, aus Veröffentlichungen des Zentralinstituts für Erdbebenforschung in Jena 1949, Heft 51, Seiten 6314 98.
Physica Verlag Würzburg vol. 36, 1973 Article "Array-Seismologie".
Norsar Norwegian Seismic Array Seismological Verification of a Comprehensive Nuclear Test Ban.
Sawarenski and Kirnos "Elemente der Seismologie und Seismometrie".
Nobel Hefte Apr.–Sep. 1989 "Das Neue Schwingungsmessgerat der Wasagchemie".

Primary Examiner—J. Woodrow Eldred
Attorney, Agent, or Firm—Herbert Dubno; Yuri Kateshov

[57] ABSTRACT

A seismic directional sensor for solid-borne sound has at least one geophone with pronounced directional characteristic. The measuring electrical vibration signals, which are obtained at different circumferential angular positions of the radial longitudinal axis of the geophone and are to be compared with one another, are correlated with the direction of a seismic ray extending at right angles to the longitudinal axis of the geophone, which is ineffective in its neural circumferential angular position.

The neutral circumferential angular position is determined by the ratio of the amplitude of the measuring signals which are determined on both sides adjacent to the neutral circumferential angular position in effective circumferential angular positions of the geophone. The vibration pattern of the measuring signals is antiphase in relation to the respective other side.

The seismic directional sensor permits universal application with accurate measurement results along with relatively simple design and easy operation.

15 Claims, 11 Drawing Sheets

SEISMIC DIRECTIONAL SENSOR FOR SOLID-BORNE SOUND

CROSS-REFERENCE TO RELATED APPLICATION

This application is a national phase of PCT DE 90/00785 filed 15 Oct. 1990 and based in turn, of German application P 39 34 745.1 filed 18 Oct. 1989 under the International Convention.

FIELD OF THE INVENTION

The present invention relates to a seismic directional sensor for solid-borne sound with at least one geophone with pronounced directional characteristic, whose electrical measuring vibration signals, which are obtained at different circumferential angular positions of its radial longitudinal axis, are to be compared with one another, are correlated with the direction of a seismic ray that extends at right angles to the longitudinal axis of the geophone and which is ineffective in its neutral circumferential angular position.

BACKGROUND OF THE INVENTION

The prior-art directional sensor is described in a textbook by E. F. Sawaransky and D. D. Kirnos: *Elemente der Seismologie und Seismometrie* (Elements of Seismology and Seismetry), pp. 339-344, published in 1960, hereinafter referred to as "Sawarensky and Kirnos" for short.

Directional sensors for solid-borne sound are especially needed in the low-frequency range below ca. 1000 Hz and in the infrasound range below ca. 25 Hz for locating artificial and natural seismic sources which are sites of any king of underground and above-ground extracting blastings, including the seismic prospecting of deposits and layer wave seismics, the seismics of pile drivers, machines and vehicles, earthquakes, rock bursts, gas explosions, and knocking signs of spills, as well as ground vibrations induced by sound transmitted by air.

The particularly important parameters for localization of a seismic focus are the azimuth alpha (a) and the emergence of surfacing angle epsilon (a) of the seismic ray at the site of observation.

Varying from the above-described state of the art of this class (Sawarensky and Kirnos), so-called arrays are currently preferably used in earthquake seismics (cf. H. P. Harjes and M. Henger; Array Seismology, published in *Zeitschrift fur Geophysik,* 1973, vol. 39, No. 6, pp. 865 ff., hereinafter referred to as "harjes and Henger" for short. Array seismology uses compound systems of seismometers arranged over an area, which are arranged in various configurations depending on their task, e.g., for locating near and remote earthquakes or for detecting or verifying nuclear explosions. Such configurations form can be an L-shaped, cross-shaped, triangular, or, more recently, even a circular arrangement see (publication of the Royal Norwegian Ministry of Foreign Affairs, NORSAR Norwegian Seismic Array "Seismological Verification of a Comprehensive Nuclear Test Ban", pp. 4–11).

Such arrays are expensive in every respect, especially because their extent may reach a few kilometers (small arrays) or several hundred kilometers (large arrays).

In array seismology, the determination of the azimuth of the seismic ray is based essentially on the measurement of the different arrival times of the wave at the individual seismometers. This procedure is called the "position correlation method" (cf. elsewhere in Harjes and Henger, pp. 880 ff., especially in connection with FIG. 7). Using digital measurements and filtration methods and special evaluation methods (beam forming), the angular accuracy of the azimuth alpha reaches $\pm 5°$ and at times up to $\pm 3°$.

The approach suggested by Sawarensky and Kirnos with the prior-art directional sensor of this class, which was described in the introduction, differs considerably from array seismology and the extremely expensive apparatus associated with it.

The prior-art directional sensor uses the azimuthal correlation. This measurement method consists of observing the phase and the amplitude of the seismic waves as a function of the azimuth alpha of the vibration direction of a plurality of horizontal seismometers at a measuring point. In contrast to the expensive array seismology, these horizontal seismometers are concentrated into a space with a transverse extent of a few decimeters. Sawarensky and Kirnos performed their seismologic recordings with 6 to 7 horizontal seismometers (cf. Sawarensky and Kirnos, p. 341, FIG. 15). The amplitude A of the measuring vibration signal generated by a geophone on the chart recording during the transition from one channel to another now changes according to a cosine law:

$$A = A_{max} \cos(\text{beta} - \text{alpha}).$$

Here, beta is the azimuth of the direction of vibration of the seismometer for the channel in question, and alpha is the azimuth of the ground vibrations. Consequently, the curve that describes the dependence of the sensitivity of the channel on its azimuth beta, the so-called directional diagram of the channel, has the shape of a cosine line curve or, —represented in polar coordinates, the shape of a circle or double circle. Now, $$\beta = \alpha \quad A = A_{max},$$
$$\beta = \alpha + \frac{\pi}{2} \quad A = 0,$$
$$\beta = \alpha + \pi \quad A = -A_{max}.$$

For the longitudinal waves P, the recorded amplitudes will be highest for the devices (geophones) in which he azimuths of their axes coincide with the azimuth of the seismic ray (alpha).

The directional diagram of a simple azimuthal arrangement and the corresponding recording of simple waves (e.g., of P) are shown by Sawarensky and Kirnos on p. 341, FIG. 16.

The azimuth alpha of the seismic ray can thus easily be determined from the recording of the longitudinal P waves. Alpha corresponds to the azimuth beta of the channel, whose amplitude has the maximum, or it is at right angles to the beta value (i.e., beta=pi=/2+alpha) for which A=0. This ambiguity is eliminated by using a vertical seismograph. Using such an arrangement alpha can be determined somewhat more accurately than by means of the usual three-component arrangement because a greater number of projections is used.

Sawarensky and Kirnos saw a certain improvement of the determination of the azimuth in azimuthal arrangements with inclined seismometers which are set up such that no phase shift by pi, occurs in the recordings of all measuring channels, and the amplitude alone are sufficient for a reliable correlation (cf. Sawarensky and Kirnos, pp. 342, 343, FIGS. 17–19). The apparent emergence angle epsilon is now obtained from the ratio of the maximum amplitude $A_{max}$ to the minimum amplitude $A_{min}$ in the directional diagram. Now, $$\frac{A_{max}}{A_{min}} = \frac{\cos(\epsilon - \psi)}{\cos[\pi - (\epsilon + \psi)]} = -\frac{\cos(\epsilon - \psi)}{\cos(\epsilon + \psi)},$$

applies (cf. Sawarensky and Kirnos, p. 343, in conjunction with p. 342, FIG. 18) when psi, i.e., the slope angle of the apparatus against the horizontal, satisfies the condition psi>pi/2-epsilon.

The use of the directional sensor of this class, which is described in the introduction (Sawarensky and Kirnos), was limited as a consequence of the consumption of a large amount of photographic recording paper and the frequent replacement necessary in the case of stationary observations.

The prior-art directional sensor (Sawarensky and Kirnos) is highly attractive compared with the above-mentioned seismological arrays due to its compact size, which permits measuring recording of one point along with high mobility and a relatively low cost of installation. However, the prior-art directional sensor (Sawarensky and Kirnos) was found to be in need of improvement in terms of its handling and the related reduction of the accuracy of reading. An even simpler design, resulting from improved handling, would also be desirable.

OBJECTS OF THE INVENTION

The principal object of the present invention is to provide a sensor overcoming drawbacks of the prior art; and still another object is to provide a sensor with improved handling, the accuracy of the measurement obtained.

SUMMARY OF THE INVENTION

This task was accomplished according to the present invention by: first determining the neutral circumferential angular position of a geophone, and secondly by calculating the ratio of the amplitudes of the measuring signals which are determined on both sides adjacent to the neutral circumferential angular position wherein the vibration pattern of the measuring signals is antiphase relative to the respective other side.

Besides the preferred electrodynamic geophones, it is also possible to use, if desired, inductive, capacitive, or piezoelectric vibration meters.

One essential characteristic of the present invention is that the antiphase character in the range of the amplitude minimum of the vibration patterns of the signals, especially between two circumferential angular positions of a geophone, is used as the principal criterion for comparing the two amplitudes of the vibration patterns from two such adjacent circumferential angular positions. The considerable advantage of the directional sensor according to the present invention is the fact that in practice, the neutral circumferential angular position can easily be determined qualitatively e.g., pure optically, by means of an oscillograph or purely electrically, by finding a null signal of the art electrically, by finding a null signal.

A plurality of geophones can be arranged, in principle, in any circular arrangement (circle plane (circular plane, straight circular cylinder, in one or several planes), and can be turned on in an individual succession or in a group succession in order to determine the zero point, i.e., the neutral circumferential angular position, in which the geophone located there is ineffective. The invention also makes it possible to group geophones, whose longitudinal axis are located radially in a circular arrangement, or a smaller number of geophones, whose longitudinal axes are also aligned radially with respect to a circular arrangement, around the center of the circular arrangement (center or axis) in order to thus pass over the neutral circumferential angular position during the measurement process and thus determine it.

The higher accuracy of measurement of the directional sensor according to the present invention is based on the fact that the measurement result is determined at the phase reversal point, at which the infinitesimal change in amplitude dA/dt is substantially greater than in the minimum of the cosine vibration, especially because the maximum amplitude of the individual channels were compared in the case of the prior-art directional sensor (Sawarensky and Kirnos). This means that the state of the art requires the determination of exact values in order to achieve a higher accuracy of measurement, which is relatively expensive in terms of the measurement method and the apparatus required.

Another essential characteristic of the present invention is that it is not limited to the determination of the azimuth alone, but can also advantageously be used to determine the emergency or surfacing angle epsilon of a seismic ray. In one particular embodiment of the seismic directional sensor according to the present invention, the circumferential angular positions of the geophone are located in at least two circular arrangements, e.g., circular planes, which are perpendicular to one another, wherein one circular arrangement forms an equatorial plane for determining the azimuth alpha, and the other circular arrangement forms a polar plane for determining the emergency angle epsilon.

BRIEF DESCRIPTION OF THE DRAWING

The above and other objects, features and advantages will become more readily apparent from the following description, references being made to the accompanying drawing, in which.

SPECIFIC DESCRIPTION

Figure 7:
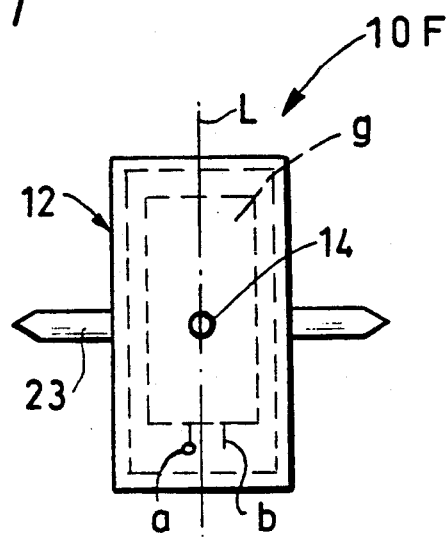
FIG. 7 is a top view according to the arrow designated by VII in FIG. 6.
Figure 8:
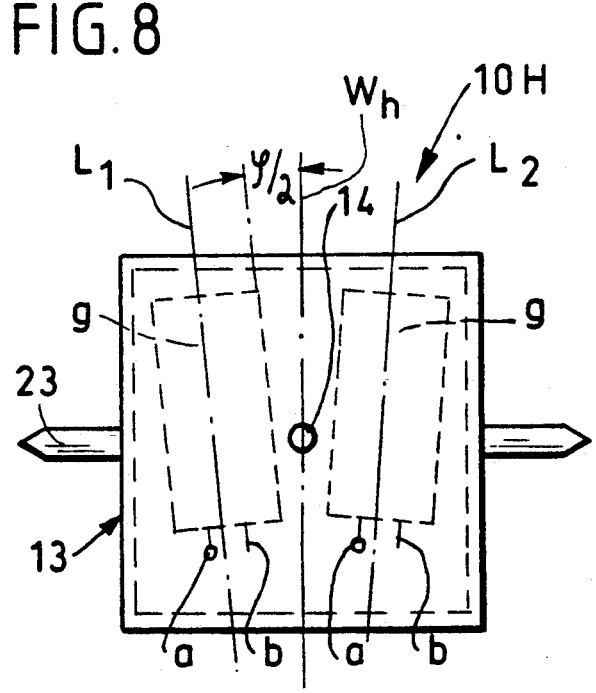
FIG. 8 is a top view according to the arrow designated by VIII in FIG. 6, FIGS. 9 and 10 are schematic views of an illustration of the mode of operation of the directional sensor for determining the azimuth, which is shown in FIG. 1.

The different designs of directional sensors in the drawings are designated by 10A (FIG. 1), 10B (FIG. 2), 10C (FIG. 3), 10D (FIG. 4), 10E (FIG. 5), 10F (FIGS. 6 and 7), and 10H (FIG. 8).

Each individual geophone is designated by the letter g, which is associated with a certain number indicating the order of the geophones with respect to a circumferential angular position in relation to the other geophones.

To realize a directional sensor, the greatest possible number of geophones with omnidirectional characteristics, e.g., 12 selected 15-Hz geophones g1-g12 from the Dutch firm of Sensor, are arranged reproducibly in one or several planes, especially radially symmetrically, in defined geophone vibration directions. Thus, geophones g1-g12 with equal angular distances phi=30° are arranged in a circle, as is particularly clearly apparent from FIGS. 9 and 10.

Figure 1:
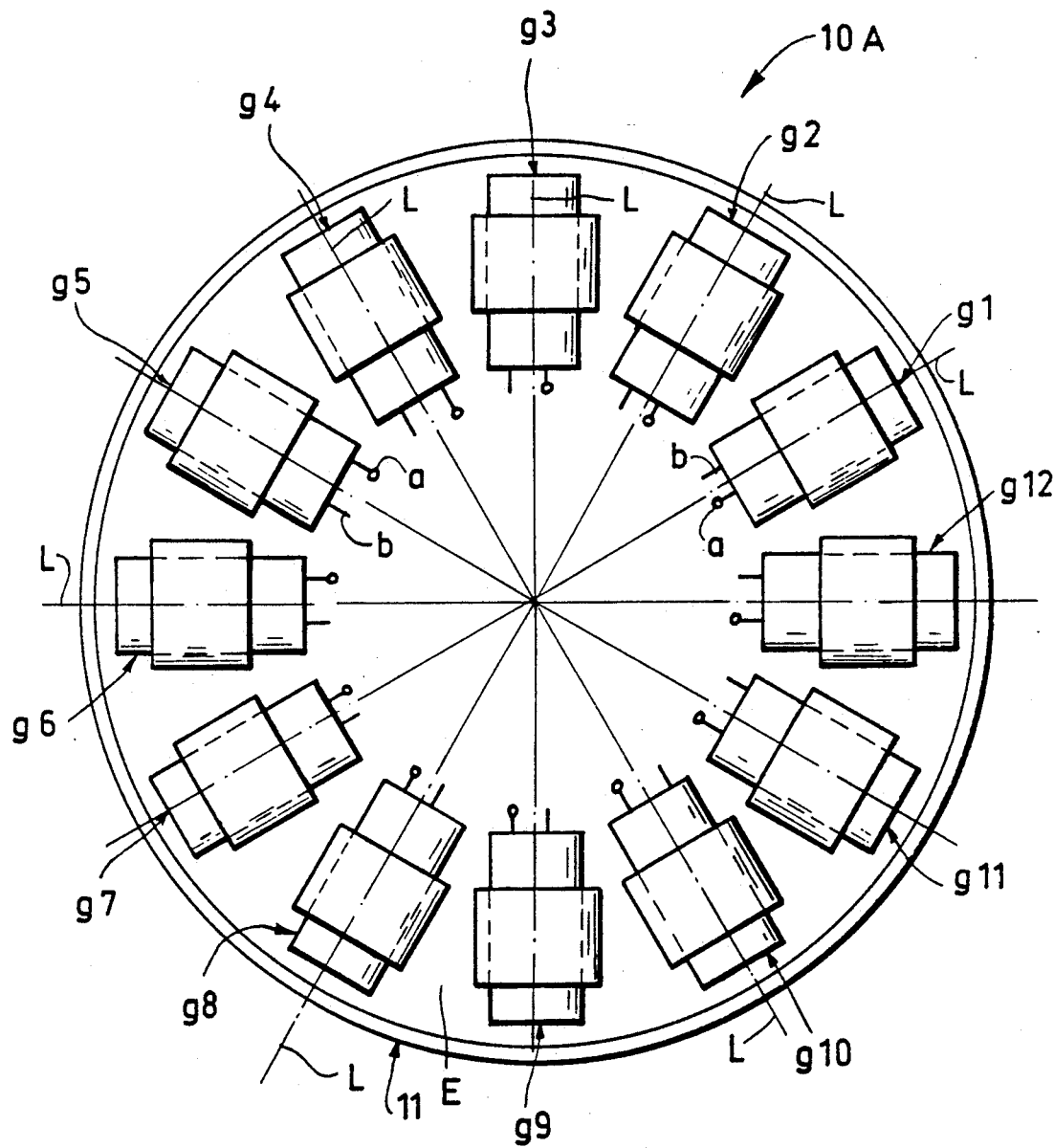
FIG. 1 is a schematic view of a seismic directional sensor for determining the azimuth.
Figure 9:
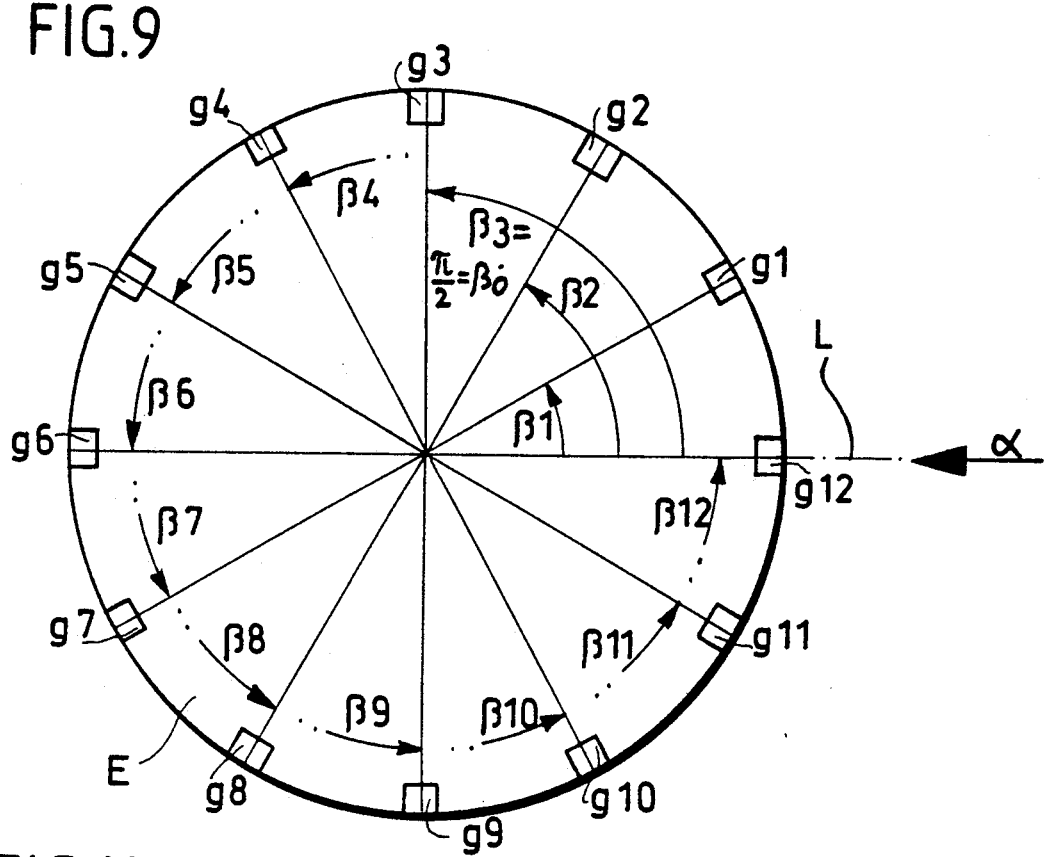
Figure 10:
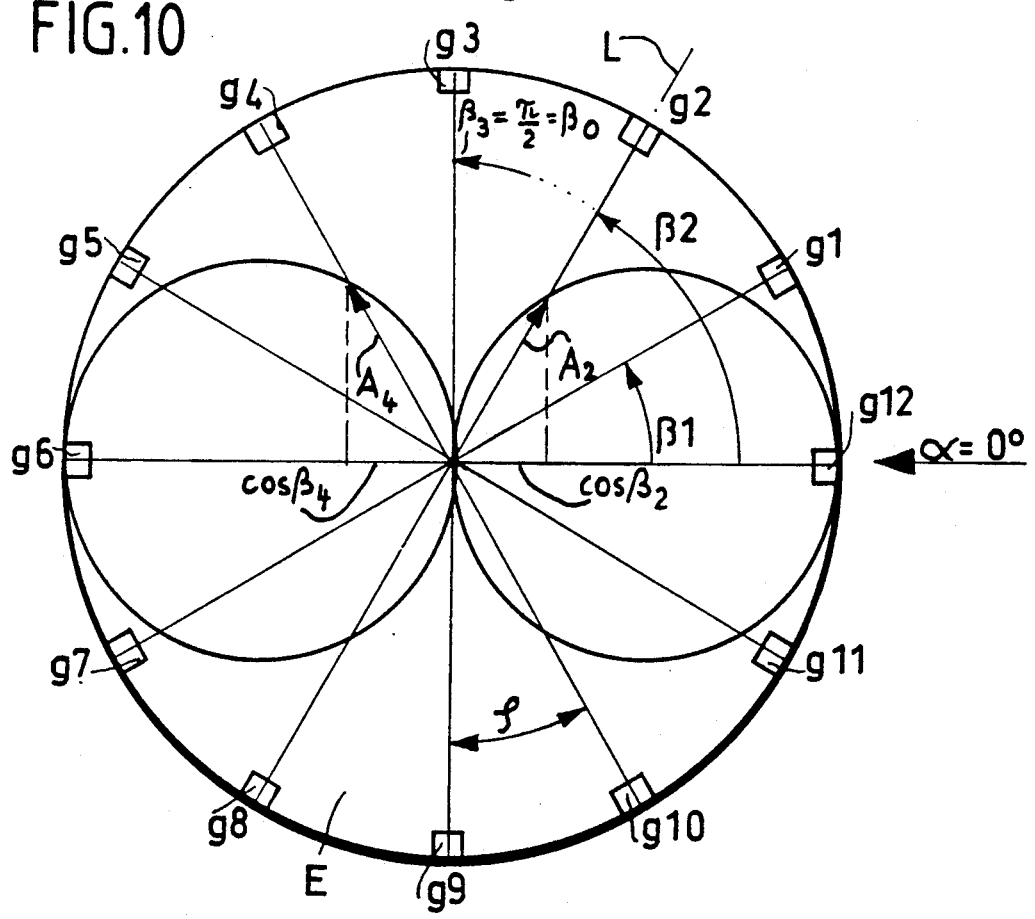

The embodiment of a directional sensor corresponding to FIGS. 9 and 10 is shown in FIG. 1.

According to FIGS. 1, 9 and 10, all the longitudinal center lines L of the geophones g1-g12 are located in the same plane E, which is formed, according to FIG. 1, by the flat circular area of a circular mounting plate 11.

The individual geophones g are such that they are most sensitive, i.e., they produce the greatest vibration amplitude and consequently the most intense electrical signal, along their longitudinal center lines L on incidence of a seismic ray.

One angle leg of the corresponding seismometer azimuth, which is generally designated by beta, points in the same direction as the corresponding longitudinal axis L of any geophone g (cf. FIGS. 9 and 10).

For example, the seismometer azimuth $beta_{12}$ is associated with the geophone g12, and the seismometer azimuth $beta_8$ is associated with the geophone g8.

Figure 12:
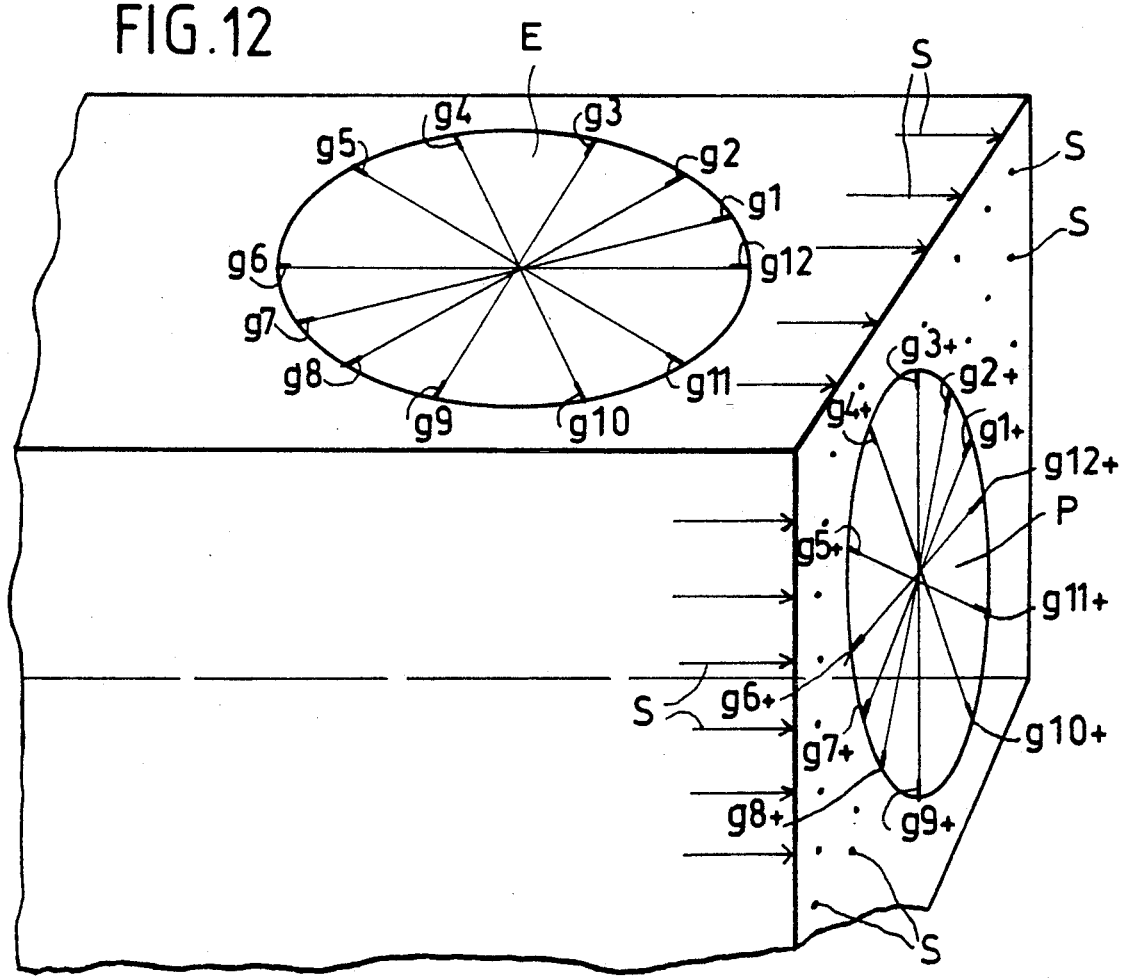

According to FIG. 9, the azimuth of the ground vibrations or of the seismic ray is designated by alpha, and a plurality of parallel rays occurring simultaneously is assumed, as is indicated, in FIG. 12 in connection with another embodiment.

Based on FIG. 9 the individual geophones g6 and g12 whose longitudinal axes L are exactly parallel to or are located in the direction of the seismic ray with the azimuth alpha, have the greatest vibration amplitudes corresponding to the seismometer azimuths $beta_6$ and $beta_{12}$. Further, it would also be easy to imagine that the longitudinal axes L of the geophones g3 and g9, with which the seismometer azimuths $beta_3$ and $beta_9$ are associated, are located in a respective neutral circumferential angular position, in which the geophones do not respond to the seismic rays occurring at right angles to the longitudinal axes L.

Figure 11:
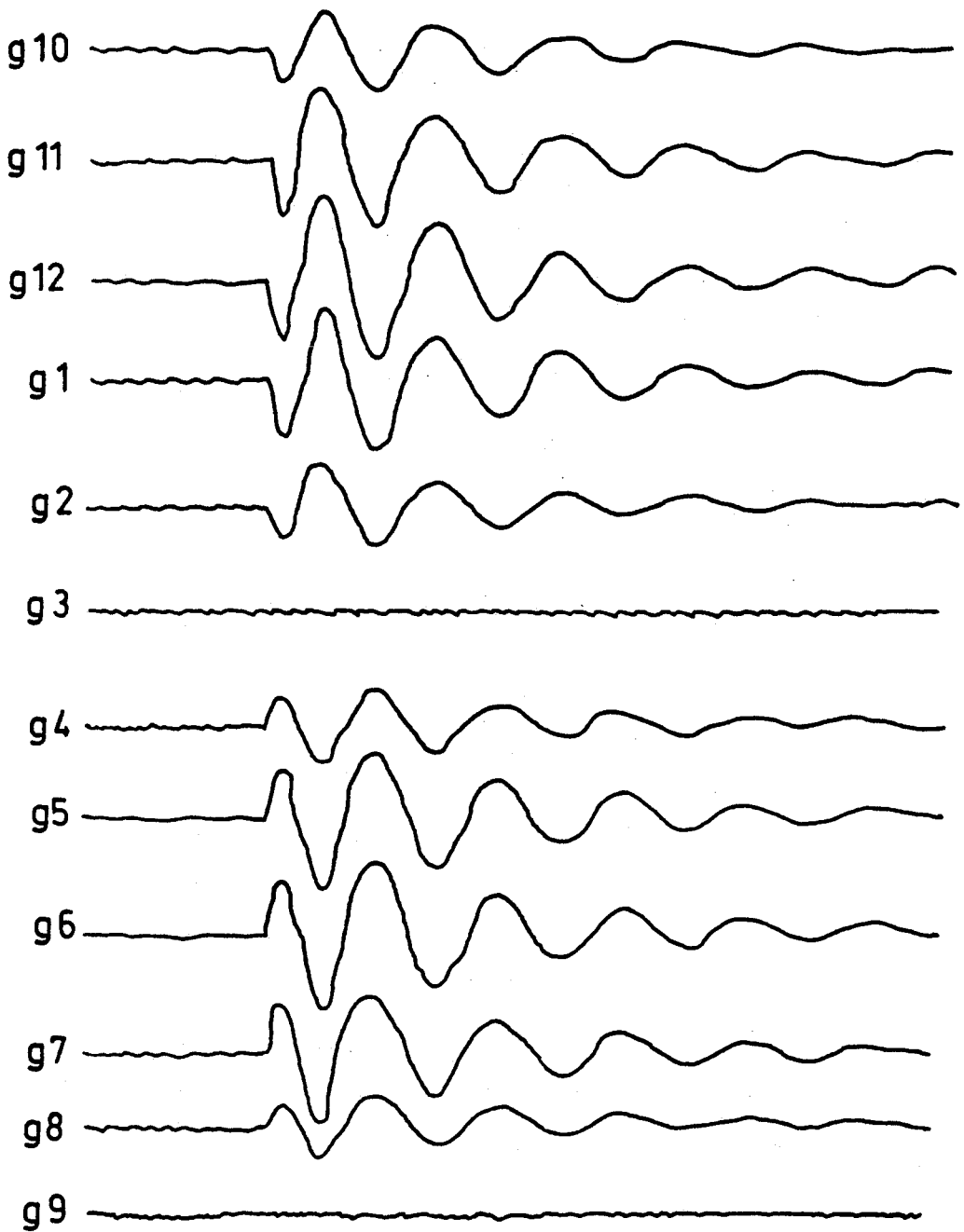
FIG. 11 is a schematic representation of the reproduction of a chart recording obtained with the directional sensor according to FIG. 1 for a vibration representing an impulse.

A recording corresponding to FIG. 9 is shown in FIG. 11. It is clearly apparent that the geophones g12 and g6 record the greatest vibration amplitudes, while the geophones g3 and g9 practically do not respond.

This effect is utilized in the present invention by determining the site or sites at which one geophone or a plurality of geophones do not respond in the presence of seismic ground vibrations in order to determine the direction of a seismic ray with the azimuth alpha. According to FIG. 9, these zero positions can be associated with the geophones g3 and g9, and the direction of the seismic ray extends at right angles to their longitudinal axes L, which are determined by the seismometer azimuth $beta_3$ and $beta_9$.

An examination of FIG. 11 shows clearly that the zero points to be associated with the geophones g3 and g9 are easy to find, because these zero points also introduce the phase reversal of the vibrations. Consequently, the measuring track at g3 is, to some extent, a plane of mirror symmetry for a family of curves. Thus, the phase reversal at the zero points is a particularly remarkable, and therefore easy-to-detect characteristic. Therefore, a zero point can be very easily determined optically, e.g., by visual inspection in an oscillogram. On the other hand, such a zero point can also be located as an unambiguous sign even with a relatively inexpensive electronic apparatus.

FIG. 10 shows the angular relations and angular functions of the geophones g1-g12. The appearance of a zero point is described by $$\beta_0 = \alpha + \frac{\pi}{2} \; bzw. \; \beta_o = \alpha + \frac{3}{2}\pi.$$

The seismometer azimuth distance phi is generally described by $$\phi = \beta_{n+1} - \beta_n.$$

The vibration amplitudes are combined with the letter A. Corresponding to the example shown, $$\frac{A_2}{A_4} = \frac{\cos \beta_2}{\cos \beta_4}.$$

formula, p. 12.

If $A_2/A_4 = 1$, then $\cos beta_2/\cos beta_4 = 1$ and $$beta_0 = \frac{\beta_2 + \beta_4}{2}$$

and consequently, the azimuth alpha=$beta_0$=pi/2=0°.

$Beta_0$, i.e., also alpha, can easily be calculated from the ratios of the values or found in tables even in the case of antiphase amplitudes of other pairs of geophones, so that the alpha value is confirmed by multiple determination, depending on channel selection and antiphase geophone pairs.

An analogous procedure is followed to determine the emergence angle epsilon of the polar plane to be discussed in greater detail below. An angular accuracy of delta alpha and delta epsilon = ≦1° was reached in the practical experiments.

All the directional sensors shown operate highly accurately because the change in amplitude, delta A, is substantially greater in the vicinity of the remarkable phase reversal ranges than in the range of the amplitude maximum. The azimuth and the emergence angle can thus be determined more accurately than according to the state of the art, in which only the range of the amplitude maximum with alpha=beta is used. For example, the cosine value of the amplitude jumps from 0.0000 to 0.0523 at the phase reversal point beta$_0$=90° at a delta beta of only 3°, i.e., in the case of a reduction to 87°, while the cosine value for the same 3° change decreases from 1.000 (at 0°) to only 0.9986 in the range of the amplitude maximum. In another example, the change in the cosine value of the amplitude is 0.03491 in the range of the phase reversal at a 2° change in the direction of the seismic ray (e.g., from 1° to 3°), whereas the change in the cosine value of the amplitude reaches only 0.00122 in the range of the amplitude maximum. This means that the change in the amplitude is 28.6 times greater in the range of the phase reversal than in the range of $A_{max}$ (cf. FIG. 10).

It should be added in connection with the drawings, including FIGS. 1 9 and 10, that the connections a and b of the individual geophones g are connected electrically in identical phase.

The plane E according to FIGS. 1, 9 and 10 also forms the equatorial plane for the respective azimuth alpha or beta.

A zero point (e.g., at g3 in FIG. 11) can be determined by arranging stationary all the geophones g1-g12 with said mounting plate 11 and switching on all geophones simultaneously. The entire recording shown in FIG. 11 would thus be obtained at the same time. Such a procedure is advantageous when the seismic event, as shown in FIG. 11, represents a pulsed vibration (attenuated vibration) with an initially high and subsequently declining amplitudes. If ground vibrations occur periodically for relatively long time periods as uniform pulse trains or continuously, it is also possible to activate the geophones g1-g12 according to FIG. 1, e.g., successively. Analogously to the representation according to FIG. 11, either sine-like measuring tracks (nonattenuated vibration pattern) or impulse seismograms with amplitude A different from one track to the next would be obtained in this case. Assuming the same azimuth alpha for the seismic ray, the vibration patterns generated by the geophones g12 and g6 would have the highest amplitudes, whereas the zero points would again be located at g3 and g9.

It is also worth noting that a geophone plane E does not necessarily have to have the relatively great number of 12 individual geophones. For example, a geophone arrangement according to FIGS. 6-8 is sufficient for locating periodically occurring ground vibrations or impulse series.

According to FIG. 7, the directional sensor 10F has an individual geophone g, while the directional sensor 10H (FIGS.) has two individual geophones g, which are arranged at a fixed angular distance phi=5°.

Figure 6:
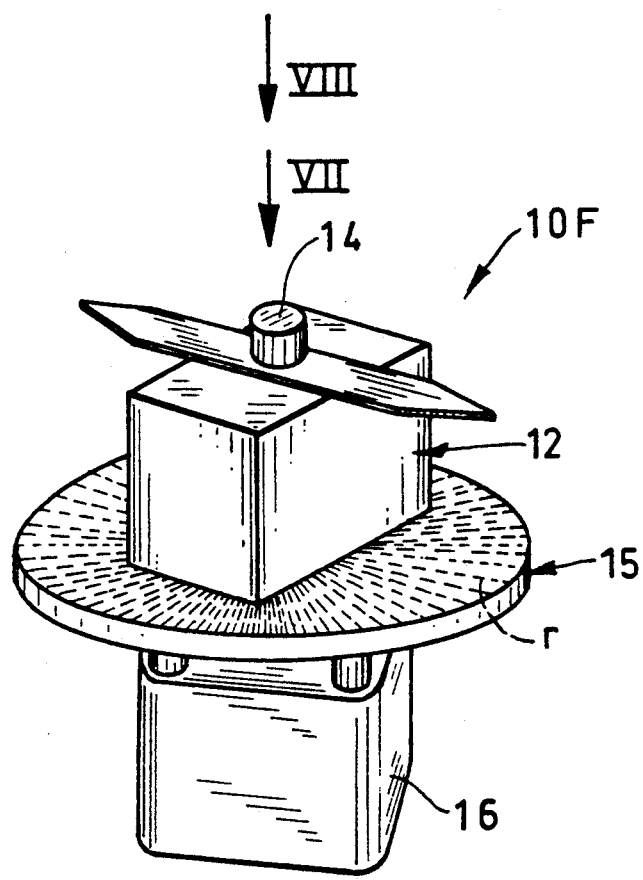
FIG. 6 is a schematic perspective view of a directional sensor rotated by a motor for determining the azimuth.

The perspective view according to FIG. 6 shows the directional sensor 10F with only one geophone g, i.e., a relatively narrow housing 12, whereas the housing 13 of the directional sensor 10H according to FIG. 8 must be designed as a broader housing for accommodating two geophones g. However, the directional sensors 10F and 10H are essentially identical in terms of their design principles. The housings 12, 13 are arranged centrally around the vertical axis 14 and rotatably with respect to a circular plate 15 provided with angle radii r. Plate 15 is supported on the housing 16 of a stepping motor which rotates the geophone housings 12 and 13, respectively, at constant angular steps. The zero points can thus be determined analogously to FIG. 11 clearly and at high resolution, especially because such a directional sensor 10F or 10H, which is designed as a rotary geophone, operates with relatively small angle steps of, e.g., 3.75° per step.

Both housings 12, 13 carry one pointer 23 each, which indicates, e.g., the azimuth alpha of a seismic ray when the geophone longitudinal axis L of the directional sensor 10F or the angle bisector Wh between the two geophone longitudinal axes $L_1$, $L_2$ of the directional sensor 10H are located in their neutral circumferential angular position. Therefore, pointer 23 extends at right angles to L (FIG. 7) and Wh (FIG. 8).

Figure 14:
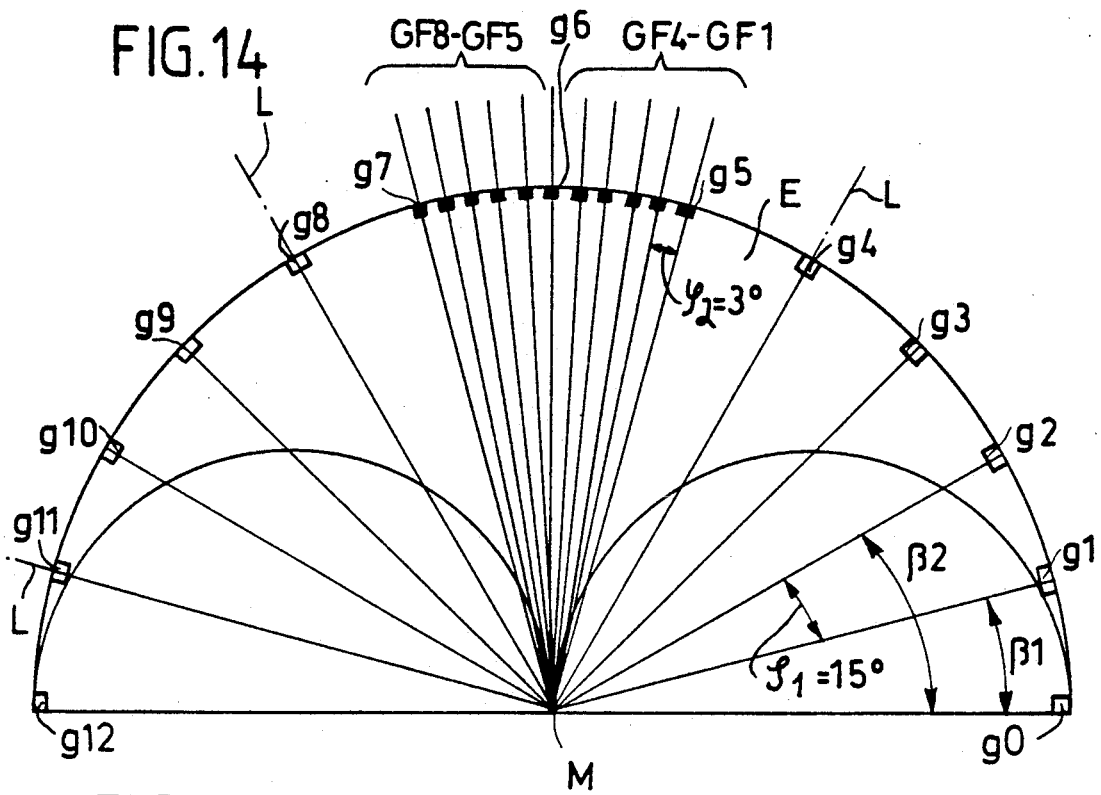
FIG. 14 shows a schematic reproduction of a double-fan directional sensor.

Another different arrangement of geophones within a plane E is shown in FIG. 14. According to FIG. 14, 13 individual geophones, i.e., the geophones g1-g12, with an angular distance of phi=15° each, are arranged centrosymmetrically around the center M. In addition, 9 geophones GF1-GF8, which have an angular distance of phi=3° from one another and from the geophones g5, g6, and g7, are arranged in the central zone of 30°. Thus, a directional sensor with high resolution is obtained, and the directional sensor has two resolution ranges, one large fan with the geophones g0-g12, and one small fan with the geophones GF1-GF8 as well as g5-g7. Similarly to photography, a "bifocal" sensor is thus obtained, and the central 30°-fan with the geophones GF1-GF8 as well as g5-g7 acts practically as a telephoto lens, and the rest of the range acts as a wide-angle lens.

One practical embodiment, representing a slight modification of the embodiment according to FIG. 14, is obtained by arranging—in a manner not shown—the small fan extending over a circumferential angle range of 30° with the geophones GF1-GF8 in a second plane parallel to the plane E. It is thus possible to accommodate all 21 geophones according to FIG. 14 in a housing with a volume of only 2000 cm$^3$.

It is imaginable that a seismic directional sensor corresponding to FIGS. 1, 9 and 10 with its plane E can also be displaced into a vertical position, so that the equatorial plane becomes a polar lane for determining the emergence angle epsilon of a seismic ray. Corresponding to a preferred embodiment of the present invention according to FIG. 2 as well as FIGS. 12 and 13, a three-dimensionally operating directional sensor has, besides the geophone arrangement plane E (equatorial plane), another plane P (polar plane), which is perpendicular to the first plane. A compact design is obtained if the two circular planes centrosymmetrically interpenetrate one another (FIGS. 2 and 13).

Figure 2:
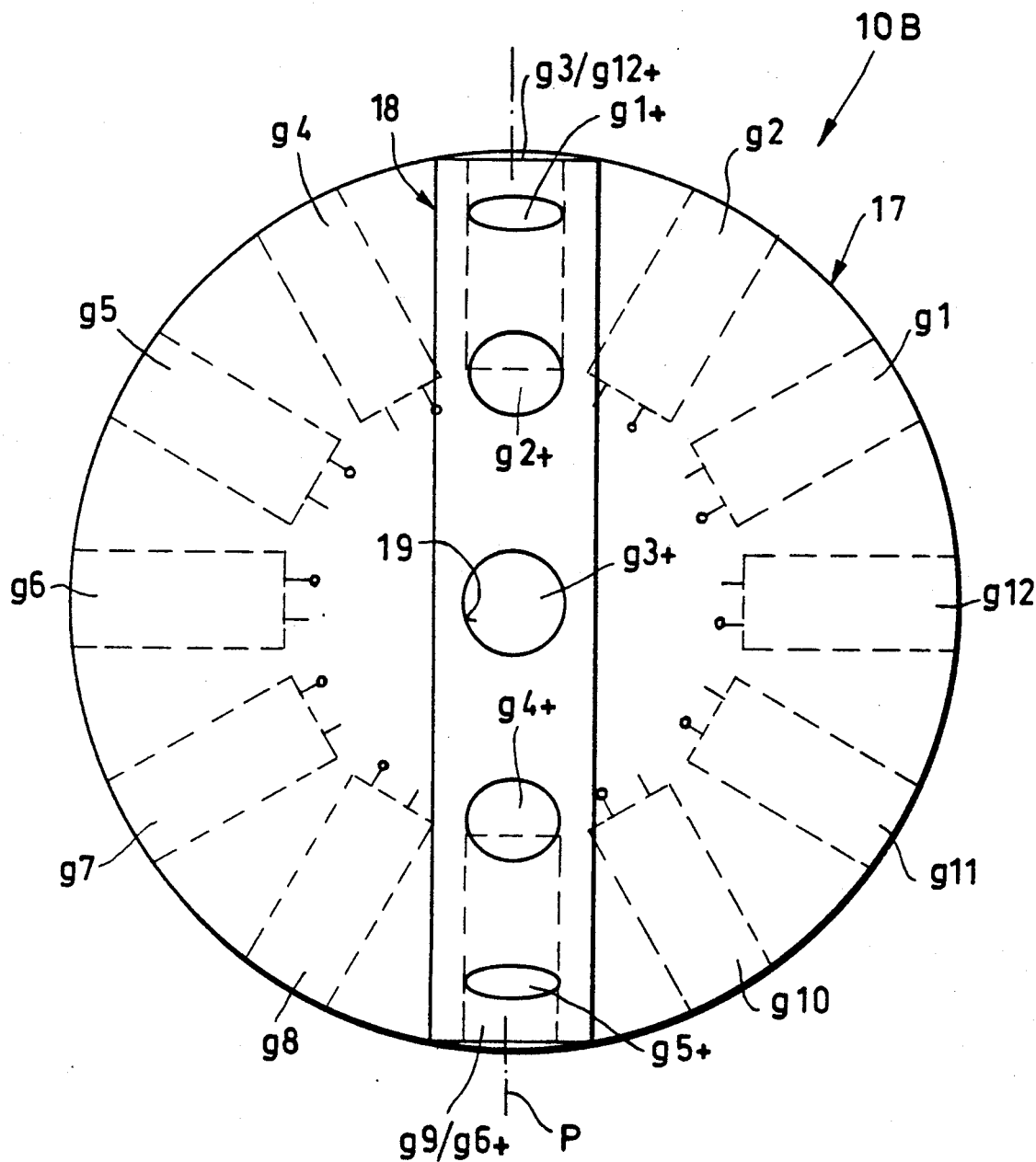
FIG. 2 is a schematic view of a seismic directional sensor for determining the azimuth and the emergency angle.
Figure 13:
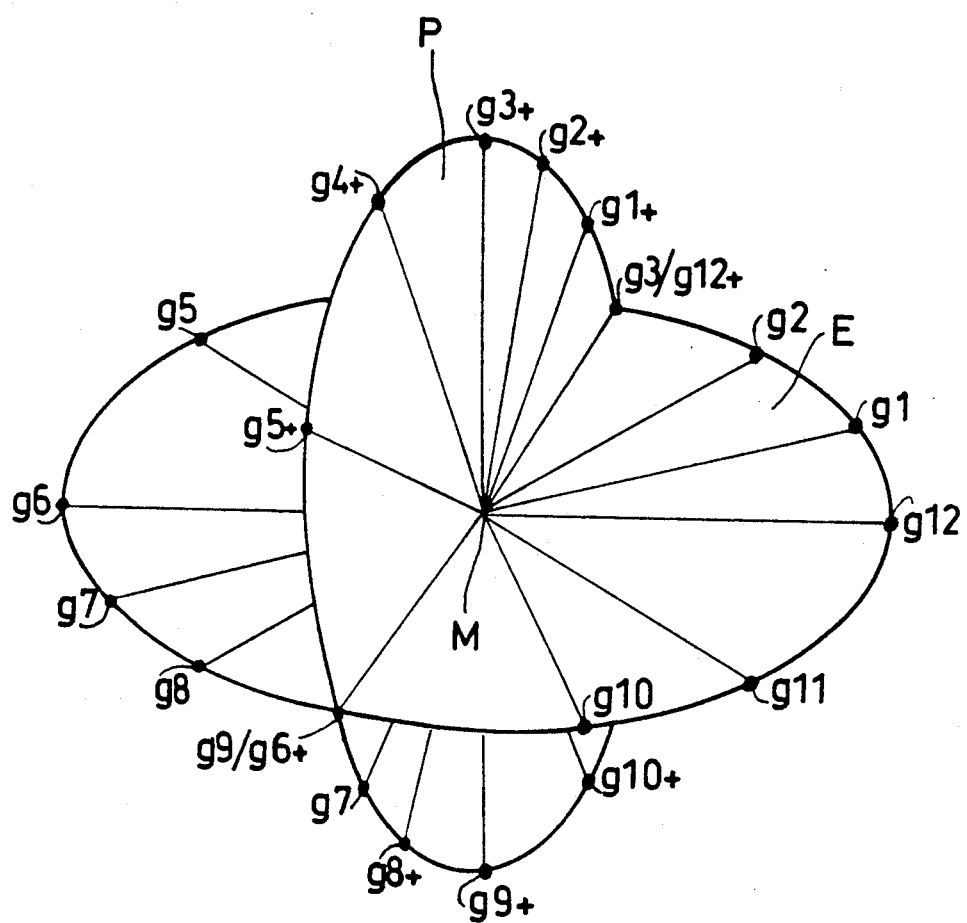
FIGS. 12 and 13 are schematic representations of an illustration of the mode of operation of a directional sensor according to FIG. 2, which is used to determine both the azimuth and the emergence angle.

In many other practical cases, coverage of a subspace (hemispherical space or other spherical segments) is sufficient instead of detecting the entire full space (FIGS. 2, 12 and 13).

For the technical embodiment of the directional sensors according to the present invention, the seismic ray to be determined in the zone of the measurement point is assumed to be part of a bundle of parallel rays with flat wave fronts, as in optics. According to FIG. 12, these rays are indicated as arrows and are designated by S. The arrangement of the geophones in two mutually perpendicular planes E and P according to FIG. 12 leads to a full-space or spherical probe. The individual geophones of the equatorial plane E correspond, in principle, to the representations in FIGS. 1 9 and 10. Therefore, the geophones g1-g12 are used to determine the azimuth alpha, while the geophones g1+ through g12+, located in the polar plane P, are used to determine the emergence angle epsilon, which equals zero according to FIG. 12 when the bundle of seismic rays falls on the polar plane P at right angles.

If the two circular planes E and P according to FIG. 12 are allowed to interpenetrate one another, and are arranged centrally with respect to a center M or a common axis, it is possible to dispense with 2 of the 24 geophones otherwise required according to FIG. 12, because the geophones g3 and g9 of the equatorial plane E also assume the function of the geophones g6+ and g12+ of the polar plane P.

The device used for the embodiment shown schematically in FIG. 13 is obtained from FIG. 2. Two mutually perpendicular circular disks 17 (for the equatorial plane E) and 18 (for the polar plane P) receive the geophones in installation bores 19.

It is easy to see that individual geophones can be arranged in the bundle of parallel rays (cf. FIG. 12) as if they were arranged on a full circle in a defined order, e.g., on an imaginary circular plane, centrosymmetrically at equal circumferential angular distances, so that the system has the desired omnidirectional characteristics for a plane in question (equatorial plane E or polar plane P). Depending on the intended use, it is thus possible to arrange directional sensors with spherical probe or whole space characteristics in a fan-shaped arrangement in cylindrical, parallelepipedic, spherical, or similar housings.

Thus, the equatorial plane E for, e.g., 12 geophones with an azimuthal distance of phi=30° can be formed in three small partial spaces which are stacked up one on top of another and are offset by 30° relative to one another, with geophone distances of 90° each on each partial plane (not shown). The polar plane P is subdivided into two small parallel partial planes, on which the geophones are also built up at an angular distance of phi=30°, likewise in such an order that the polar plane P thus formed has an omnidirectional directional characteristic. The borehole sensor shown in FIG. 4 should be mentioned in this connection.

Figure 4:
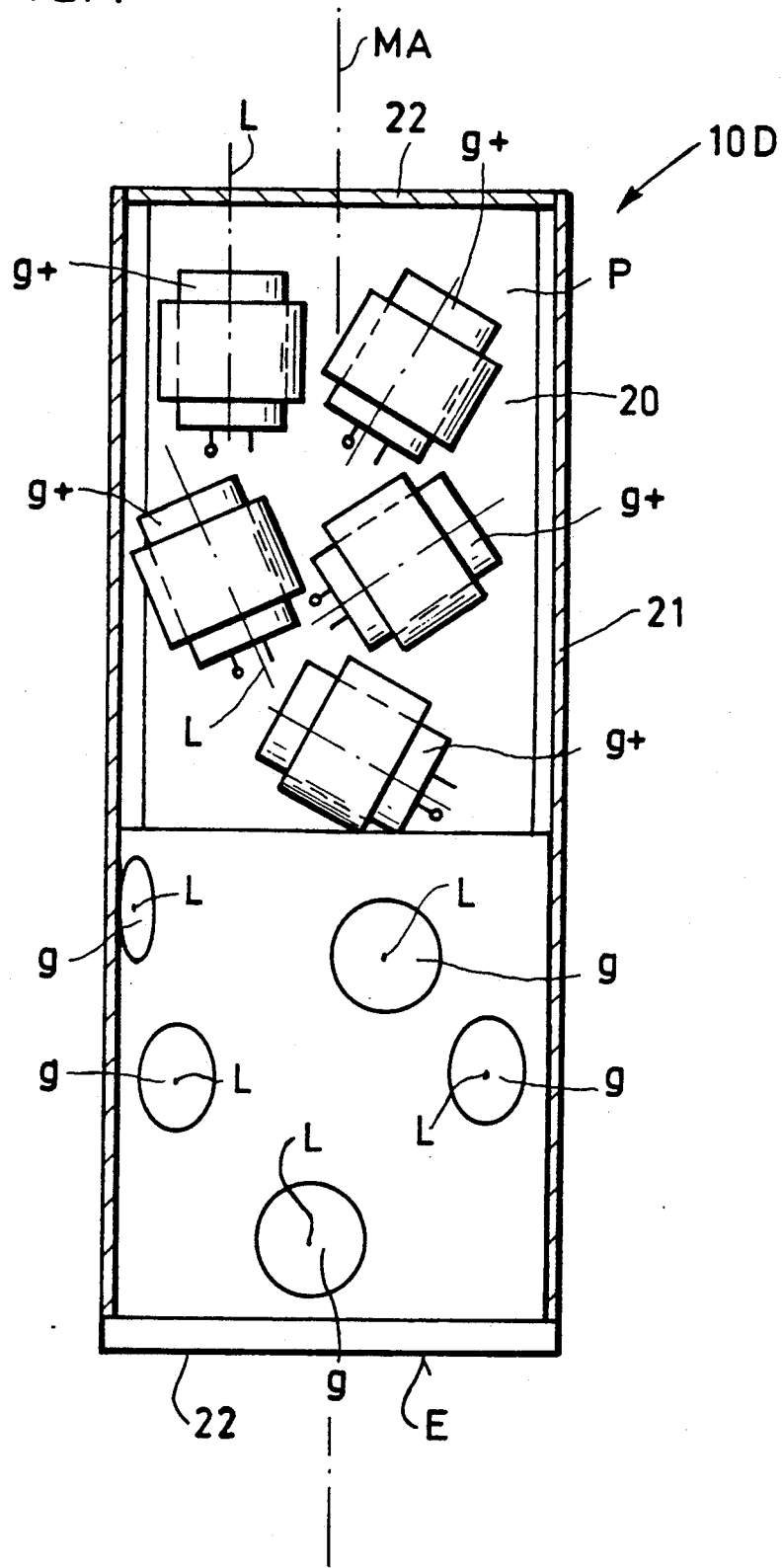
FIG. 4 is a schematic view of a borehole sensor, which permits both the determination of the azimuth and the determination of the emergency angle.

The borehole sensor 10D according to FIG. 4 has an upper zone with a radial mounting plate 20, which carries, on both sides (only one side of the mounting plate is shown), five geophones g+ each, whose longitudinal axes L are arranged such that all 10 geophones g+ (again, under the assumption of a bundle of parallel rays) are able to substitute a vertically arranged circular disk defining the polar plane P analogously to the circular disk 18 according to FIG. 2. Consequently, the 10 geophones g+ are arranged at an angular distance of phi=30° relative to one another. The geophones g+ in the upper zone of the borehole sensor 10D are consequently used to determine the emergence angle epsilon, while the 12 geophones g arranged in the lower zone of the borehole sensor 10D on a circular cylinder around its cylinder axis MA distributed over the circumference and offset in height (again, under the assumption of a bundle of parallel rays) substitute for a centrosymmetric arrangement (FIG. 1). Consequently, the geophones g3 and g9 of the equatorial plane E again also assume the function of the geophones g6+ and g12+ of the polar panel P, as in FIG. 12.

It should also be mentioned that the arrangement described according to FIG. 4 is applicable to vertical boreholes. Borehole sensor 10D may, of course, also be used for horizontal boreholes, in which case the plane P would be formed from plane E (and vice versa).

It is, of course, also possible to separate the upper zone and the lower zone of the borehole sensor according to FIG. 4, so that the two separate borehole probes, i.e., a P probe and an E probe, would be formed.

Figure 3:
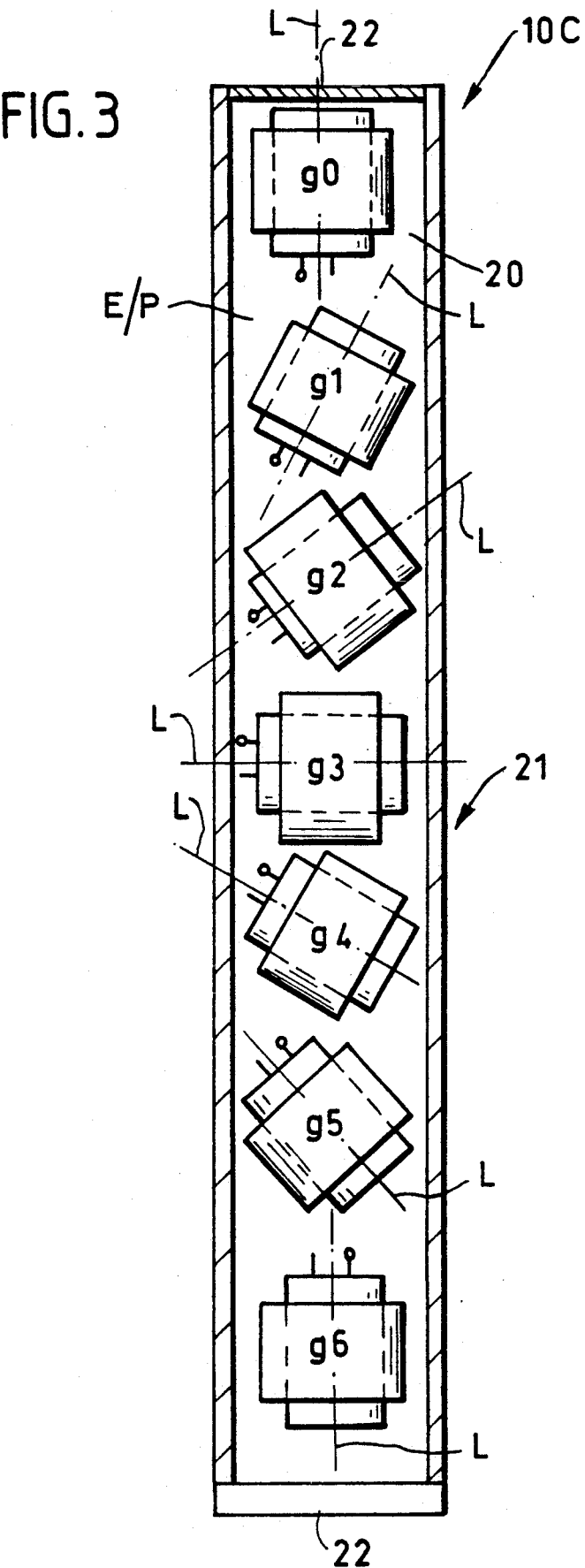
FIG. 3 is a schematic view of a borehole sensor for determining the azimuth or the emergency angle.

FIG. 3 shows a borehole sensor, e.g., for layer wave studies, with seven geophones g0–g6 for a 180° fan with phi=30° on a mounting plate 20. Depending on the rotation and the location in the borehole, this borehole sensor 10C can respond as an equatorial plane E or as a polar plane P.

Figure 5:
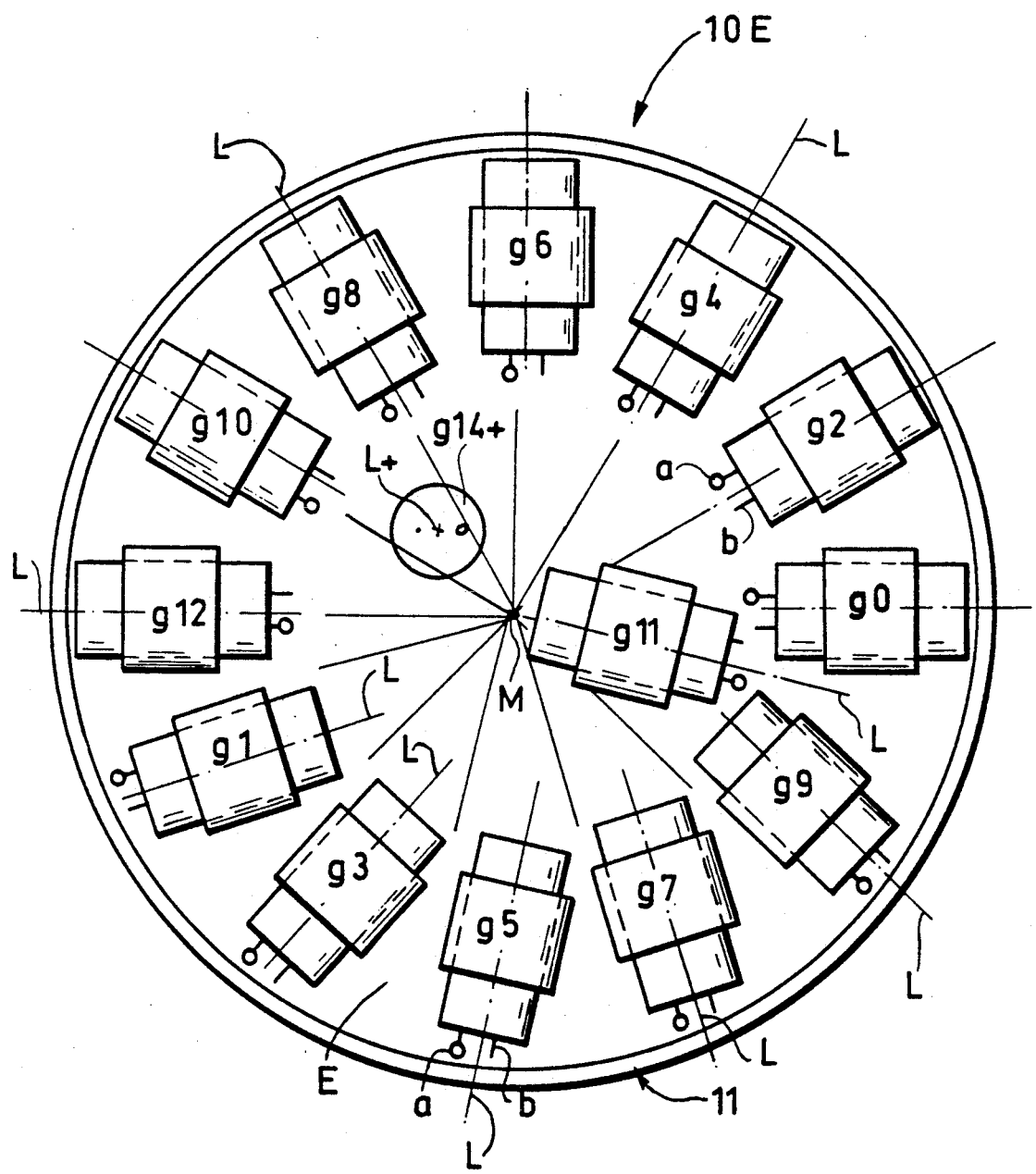
FIG. 5 is a schematic view of a seismic directional sensor of compact design for the azimuth range of 180° for determining the azimuth.

FIG. 5 shows a compact design of a directional sensor 10E intended for determining the azimuth alpha. The longitudinal axes L of the geophones g0–g12 in the equatorial plane E are arranged as if all geophones E were located on a semicircular line of a larger diameter. Therefore, the directional sensor 10E forms only one fan or azimuth range of 180°.

The longitudinal axis L+ of the geophone g14+, which is alluded to in the drawing, extends perpendicularly to the plane E. The geophone g14+ is used to determine a possibly existing transverse component of a seismic ray. All the above-described borehole sensors 10C (FIG. 3), 10D (FIG. 4), and 10E (FIG. 5) have circular cylindrical housings 21 and corresponding covers 22 for producing an arrangement that is impermeable to liquids.

Depending on the type of the ground vibrations and the number of channels (number of geophones g) available, different devices are available for performing measurements and the necessary evaluations with the above-described directional sensors. The signals of all individual geophones g in the multichannel sensors described should be available at the recording or evaluating device via separate two-wire lines or via corresponding wireless long-range transmission in order to make multifaceted processing possible. Various combination and selection connections can be performed.

The directional sensors shown are particularly well suited for investigations even in the infrared range down to 1 Hz for the measurement, monitoring, and location of seismic events of all types.

As was mentioned farther above, maintenance of the same poling a, b of successive geophones g is important for the functioning of all directional sensors. In addition, it is advantageous for both poles a, b to be lead out from each geophone in order to have a possibility of selectively polling each individual geophone g.

To locate the epicenter of a seismic source with the directional sensors described, the azimuth alpha or the directional beam from a measurement point can be determined, as was described, rather accurately and relatively simply. With a second directional sensor at a second measuring point, which is located at a corresponding distance from the first one, a second directional beam is determined; the intersection of the two directional beams will define the locus of the epicenter of the seismic source according to the method of intersection known from surveying.

As is common in seismology, the distance between the measurement point and the seismic source can be determined from the seismogram of the ground vibrations arriving at the measurement point on the basis of the travel time differences between the P and S waves as well. If this method is employed, only one directional sensor is needed to locate the seismic source.

The application of the present invention, namely, the particularly simple determination of the direction of a seismic ray (azimuth alpha and emergence angle epsilon) by the ratio or the quotient of antiphase amplitudes of geophone pairs and the technical embodiment of suitable probes or sensors and instruments have been facilitated by the advances made in recent years in digital measuring and evaluation techniques and in the manufacture of small geophones of the highest quality with reliable omnidirectional directional characteristics. For example, a measuring frequency range of ca. 1-1000 Hz is covered with high time resolution by the new SM 6 geophones (inherent frequency 15 Hz) from the above-mentioned firm of Sensor in connection with digital filters, low-noise amplifiers, computers with memories and modern recording devices (e.g., transient recorders with screen display and high-speed printers) (cf. Hummel, D.: The new vibration meter from WASAGCHEMIE Synthen GmbH, model ZEB/SM-8K for all occurring frequency ranges, *Nobelhefte*, 1989, 2/3, pp. 98-103). These recording devices are very well suited for the above-described necessary phase measurements and amplitude ratios of the new directional sensors. In the case of audible solid-borne sound frequencies, it is, of course, also possible to determine the antiphase amplitude minimum acoustically, via headphone or loudspeaker, analogously to the electrical minimum-signal direction finding method with a directional loop antenna.

The following should be added in connection with the directional sensor 10B according to FIG. 2: If the directional sensor 10B with its two planes E and P is inclined in space against a circular, graduated, horizontal reference or base plate (not shown), the section line of an imaginary plane with the base circle, which [section line] is determined by the two beta$_0$ values determined in the equatorial plane E and in the common probe center M, is relevant, e.g., for the determination of the azimuth alpha in the case of an obliquely incident seismic ray (cf. FIG. 13); this also applies analogously to the determination of epsilon.

I claim:

1. A method of obtaining seismic data comprising the steps of:
   (a) mounting at least one geophone on a first support lying in a first plane and formed with an array of angular locations thereon about a center;
   (b) mounting at least one another geophone on a second support lying in a second plane perpendicular to said first plane and formed with another array of angular locations about said center;
   (c) producing two counter phase output signals of said one geophone at two of a plurality of angular locations on said first support in response to a seismic ray impinging upon said one geophone, defining thereby a direction of said ray with an azimuth angle; and
   (d) producing two counter phase output signals of said other geophone at two of a plurality of angular locations on said second support in response to said seismic ray impinging upon said one other geophone, defining thereby the direction of said ray with an emergence angle.

2. The method defined in claim 1, further comprising the step of defining a zero location between said two angular locations of said geophones in the respective planes at which a deflection of the respective signal is minimum.

3. The method defined in claim 2, further comprising the step of determining amplitudes of the signal produced by said geophones at two angular locations adjoining the respective zero location.

4. The method defined in claim 3 further comprising the step of defining a ratio of said amplitudes in each of said planes determining thereby a vibration pattern of the seismic ray.

5. A seismic sensor assembly for collecting a seismic data, said assembly comprising:
   means forming a first support lying in a first plane and provided with an array of angular location spaced equidistantly from a center of said first support;
   means forming a second support lying in a second plane perpendicular to said first support and provided with an array of angular locations spaced equidistantly from said center;
   a first geophone arrangement including at least one geophone mounted on said first support, said one geophone producing counter phase output signals in response to a seismic ray impinging thereon at least two of said angular locations on said first support;
   a second geophone geophone arrangement including at least one another geophone mounted on said second support, said one other geophone producing counter phase output signals in response to the seismic ray impinging thereon at least two of said angular locations on said second support; and
   measuring means for picking up a respective pair of counterphase signals produced by said one and other geophones lying in perpendicular planes, so that a direction of said seismic ray is determine in said first plane with an azimuth alpha of and in said second plane with an emergence angle of said seismic ray.

6. The seismic sensor assembly defined in claim 5 wherein said first plane is an equatorial plane, said second plane is a polar plane.

7. The seismic sensor assembly defined in claim 5 wherein each of said angular locations at first and second supports follow a uniform angle division.

8. The seismic sensor assembly defined in claim 7 wherein one of said arrays of the angular locations further follows a fan-shaped division with a smaller angular distance between some of said angular locations.

9. The seismic sensor assembly defined in claim 5 wherein each of said arrays includes a plurality of geophones, each of said geophones being mounted on a respective one of the angular locations of the respective support.

10. The seismic sensor assembly defined in claim 5 wherein each of said arrays includes a respective plurality of geophones, said assembly further comprising means for selectively switching on and off said plurality of geophones of the respective array.

11. The seismic assembly defined in claim 5 further comprising means for displacing each of said one and other geophones in the respective planes angularly.

12. The seismic assembly defined in claim 11 wherein said means for displacing said geophones includes a stepping motor.

13. The seismic assembly defined in claim 12 wherein each of said supports is a disc, said disks being mounted fixed on a shaft driven by said motor.

14. The seismic assembly defined in claim 2 wherein each of said angular locations is spaced from one another at least at a 5° angle.

15. A seismic assembly for collecting a seismic data, said assembly comprising:

a housing extending along an axis and including first and second coaxial radial plates;

a first array of a plurality of angular positions formed on said first plate an oriented in a first plane;

a first plurality of geophones each mounted on a respective angular location of said first plate, at least two of said plurality of geophones producing counter phase output signals in response to a seismic ray impinging upon said two geophones;

a second array of a plurality of angular positions on said second plate and forming in a second plane perpendicular to said first plane;

two arrays of a plurality of geophones mounted respectively on said first and second plates, each of said plurality of geophones being mounted radially offset relative to said axis of said housing and forming respectively two planes extending perpendicular to one another, at least one pair of each of said pluralities of geophones producing respective counterphase output signals in response to a seismic ray impinging upon each of said pair of geophones; and measuring means for picking up respective counterphase signals of each of said pair lying in perpendicular planes, so that a direction of said seismic ray is determined in said first plane with an azimuth alpha and in said second plane with an emergence angle.

* * * * *